United States Patent
Lin et al.

(10) Patent No.: US 6,567,042 B2
(45) Date of Patent: May 20, 2003

(54) ACQUISITION THROUGH CIRCULAR CORRELATION BY PARTITION FOR GPS C/A CODE AND P(Y) CODE

(75) Inventors: David M. Lin, Beavercreek, OH (US); James B. Y. Tsui, Dayton, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 302 days.

(21) Appl. No.: 09/729,627

(22) Filed: Dec. 4, 2000

(65) Prior Publication Data

US 2002/0067307 A1 Jun. 6, 2002

(51) Int. Cl.[7] .............................. H04B 7/185; G01S 5/14
(52) U.S. Cl. ................................................. 342/357.12
(58) Field of Search ....................... 342/357.05, 357.06, 342/357.12, 357.15; 701/213, 215

(56) References Cited

U.S. PATENT DOCUMENTS

| | | | |
|---|---|---|---|
| 5,982,811 A | 11/1999 | Harrison et al. | 375/208 |
| 5,987,059 A | 11/1999 | Harrison et al. | 375/208 |
| 6,009,118 A | 12/1999 | Tiemann et al. | 375/208 |
| 6,028,883 A | 2/2000 | Tiemann et al. | 375/200 |
| 6,028,887 A | 2/2000 | Harrison et al. | 375/206 |

*Primary Examiner*—Dao Phan
(74) *Attorney, Agent, or Firm*—Gina S. Tollefson; Gerald B. Hollins; Thomas L. Kundert

(57) ABSTRACT

An improved global positioning system satellite signal acquisition method and device. The method and device of the invention reduces the number of operations in the block correlation used in determining Doppler frequency and time of the received GPS C/A and P(Y) codes. Reducing the number of operations in block correlation increases acquisition speed and reduces energy requirements, aspects conducive to commercial and military hand held GPS receivers.

12 Claims, 8 Drawing Sheets

ACQUISITION THROUGH CIRCULAR CORRELATION BY PARTITION FOR GPS C/A CODE AND P(Y) CODE

RIGHTS OF THE GOVERNMENT

The invention described herein may be manufactured and used by or for the Government of the United States for all governmental purposes without the payment of any royalty.

BACKGROUND OF THE INVENTION

The present invention relates generally to global positioning system (GPS) satellite signal acquisition and more specifically to a faster computation algorithm for GPS P(Y) code and multiple blocks C/A code satellite signal acquisition.

The nominal GPS operational constellation consists of 24 satellites that orbit the earth in 12 hours. The control segment consists of tracking stations located around the world. The GPS user segment consists of the GPS receivers and the user community. GPS provides specially coded satellite signals that can be processed in a GPS receiver, enabling the receiver to compute velocity, time and position.

The GPS satellites transmit two microwave carrier signals. FIG. 1 is a prior art drawing of GPS signals. The L1 frequency (1575.42 MHz) shown at 100 carries the navigation message. The L2 frequency represented at 105 (1227.60 MHz) is used to measure the ionospheric delay by precise positioning service equipped receivers. Three binary codes shift the L1 and/or L2 carrier phase. The Coarse Acquisition Code (C/A) shown at 102 modulates the L1 carrier phase. The C/A code is a repeating 1 MHz Pseudo Random Noise (PRN) Code. This noise-like code modulates the L1 carrier signal, "spreading" the spectrum over a 1 MHz bandwidth. The C/A code repeats every 1023 bits (one millisecond). There is a different C/A code PRN for each GPS satellite. GPS satellites are often identified by their PRN number, the unique identifier for each pseudo-random-noise code. The C/A code that modulates the L1 carrier is the basis for the civil standard positioning service (SPS).

The P-Code (Precise) shown at 104 modulates both the L1 and L2 carrier phases. The P-Code is a very long (seven days) 10 MHz PRN code. In the Anti-Spoofing (AS) mode of operation, the P-Code is encrypted into the Y-Code. The encrypted Y-Code requires a classified AS Module for each receiver channel and is for use only by authorized users with cryptographic keys. The P (Y)-Code is the basis for the precise positioning service (PPS).

The navigation message shown at 103 also modulates the L1-C/A code signal. The Navigation Message is a 50 Hz signal consisting of data bits that describe the GPS satellite orbits, clock corrections, and other system parameters.

The C/A code and P(Y) code are code division multiple access (CDMA) systems where a pair of unique signals are assigned to each satellite in the GPS phase of the C/A code or the P(Y) code. The GPS receiver applies correlation to measure timing. The received signal is correlated with the locally generated replicas of the selected satellite's signal. This process is called acquisition. The traditional GPS receiver acquires this phase by continuous sliding, multiplication, and addition. This process is time consuming and is not conducive to miniaturized receivers. The C/A code is used in civilian GPS receivers and the military GPS receivers use both C/A code and P(Y) code. In general, the military receiver acquires the C/A code and transfers this timing to P(Y) code for tracking. However, if the military GPS receiver is under hostile environment and exposed to a strong jamming threat, the less vulnerable direct P(Y) acquisition becomes necessary. The present invention applies to both the C/A code and the P(Y) code to improve the acquisition speed The conventional P(Y) code acquisition uses a time domain correlation approach as shown in FIG. 2. For each satellite, this approach correlates 10 ms of received sampled data (500,000 data points), represented at 200 with 200 locally generated replica, represented at 201. These replica are represented by $$r(m) = P_j(m\Delta t) \exp(j2\pi f_k m\Delta t) \quad (1)$$

where $\Delta t$ is sampling interval, $P_j(m\Delta t)$ is the sampled P(Y) code of satellite j, m=0, 1, 2, ..., 49,999 is a time index, and, $f_k$ is the center frequency of the locally generated replica. To acquire the P(Y) code of the received signal from a targeted satellite, 200 locally generated replica are correlated with 500,000 sampled points of the received signal. If any of these 200 correlation result is above the threshold which is pre-determined by the correlation noise floor statistics, the code and the carrier frequency acquisition is completed, as is represented at 202. If none of the results is above the threshold, another 500,000 sampled data will be processed in the same manner, as represented at 203. This new 500,000 data set, represented at 204, only shifts one data point from the previous one. This process continues until either a signal is found or 1 ms of search range is exhausted. For ±1 ms of search range, the average amount of mathematical operations is 200×50000 500000-point correlation, making the known approach a time consuming and energy consuming operation.

SUMMARY OF THE INVENTION

The present invention is an improved global positioning system satellite signal acquisition method and device. The method and device of the invention reduces the number of operations in the block correlation used in determining Doppler frequency and time of the received GPS C/A and/or P(Y) codes. Reducing the number of operations in block correlation increases acquisition speed and reduces energy requirements, aspects conducive to commercial and military GPS receivers.

It is therefore an object of the invention to provide an improved global positioning system satellite signal acquisition method and device.

It is another object of the invention to provide a GPS satellite signal acquisition method and device having a reduced number of operations for correlation processing.

It is another object of the invention to provide an improved speed and accuracy GPS satellite signal acquisition method and device.

These and other objects of the invention are described in the description, claims and accompanying drawings and are achieved by an efficient, data processing minimizing GPS data acquisition software method comprising the steps of:

receiving a GPS signal;

considering N data bits of locally generated P code in block-to-block correspondence with N data bits from said receiving step manipulating N data bits from said receiving and considering steps into a subdivision of data bits, said subdivision of data bits constituting less than a complete transmitted pattern from said receiving step;

applying a circular fast Fourier transform correlation algorithm on said data bits from said manipulating step;

repeating said applying step until an output of said applying step is above a preselected acquisition threshold value; and determining time and Doppler frequency of said GPS signal.

DETAILED DESCRIPTION

The present invention applies to both GPS C/A code and GPS P(Y) code to improve GPS receiver acquisition speed. Since the application of this invention to C/A code GPS receiver acquisition and to the P(Y) code GPS receiver acquisition is the same and P(Y) code is non-repetitive, for simplicity purposes, only the P(Y) code GPS receiver acquisition is described.

A significant aspect of the present invention is to provide GPS receiver software to reduce the number of operations needed while performing correlation to determine Doppler frequency and time of a transmitted GPS signal. Reducing the number of operations while performing correlation increases acquisition speed and reduces energy requirements. The software algorithm of the invention applies a fast Fourier transform to both transmitted (or received) GPS signal data and locally generated P-code. It multiplies the fast Fourier transform result of the received data with the complex conjugate of the fast Fourier transform result of the locally generated P-code, and then takes the inverse fast Fourier transform of the product. The software algorithm of the invention includes performing a circular correlation. Since a circular correlation is performed, both the received data and the P-code have to be manipulated to fit in a pre-determined format conducive to such circular correlation. The description of the software algorithm of the invention herein provides two possible arrangements for manipulating data prior to application of circular correlation. However, the circular correlation receiver software of the invention may be used in combination with other possible transmitted data and locally generated data combinations or manipulations.

Figure 1:
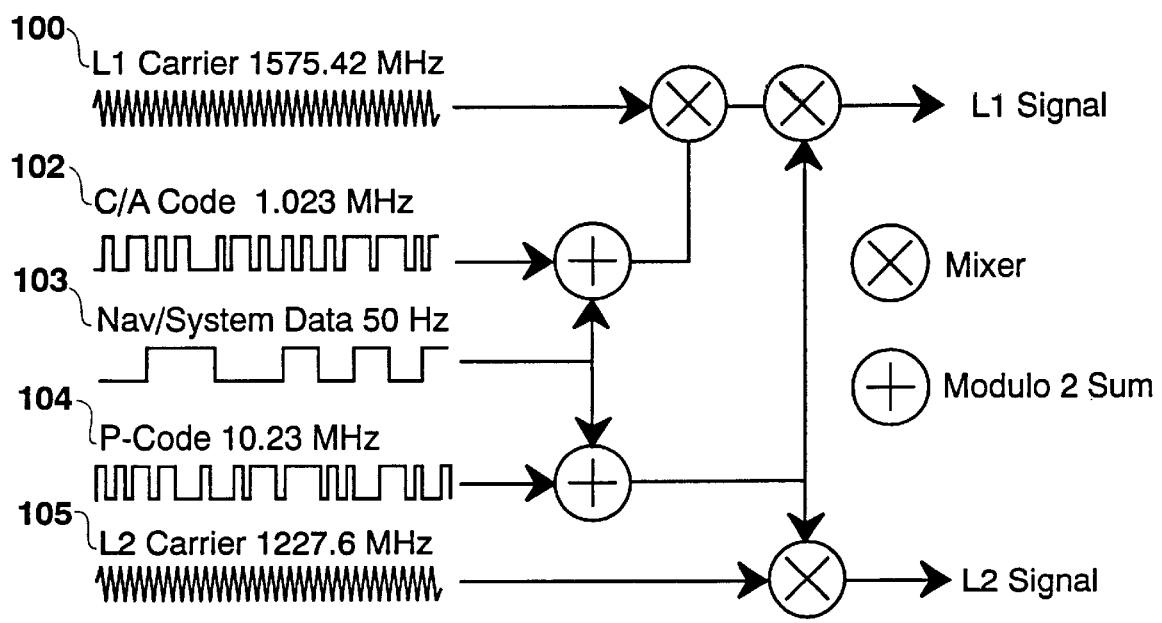
FIG. 1 is a prior art description of GPS satellite signals.
Figure 2:
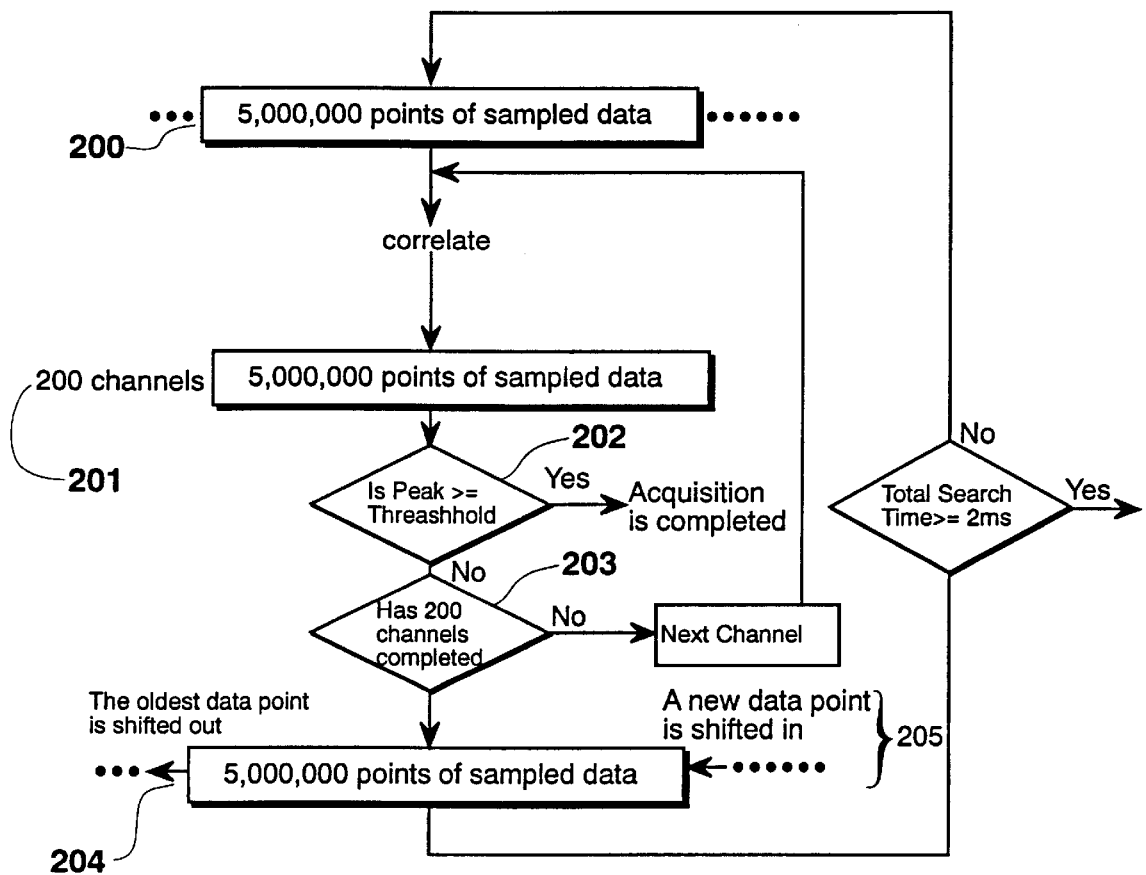
FIG. 2 shows a prior art conventional time domain approach for a GPS receiver.
Figure 3:
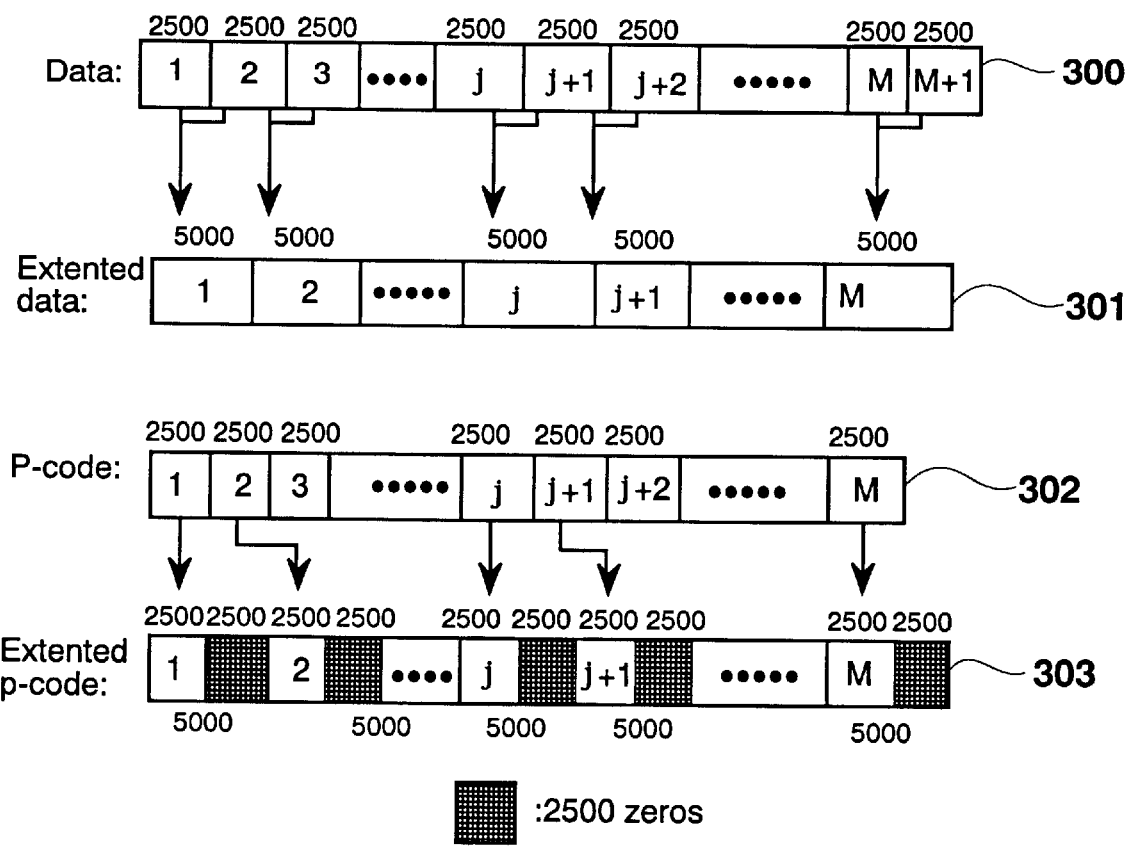
FIG. 3 shows a diagram for constructing an extended data block and extended P-code block according to the invention.

One arrangement of the invention manipulates both the received data and P-code by doubling the number of data bits and adding zeros to the original sampling. This arrangement may be referred to as the "double block and zero padding" arrangement. The double block and zero padding arrangement uses an extended data block made of two consecutive blocks. The data manipulation or block structure is illustrated in FIG. 3. As shown in FIG. 3, two contiguous 2,500-point data blocks representing transmitted data j, j+, shown at 300, are combined to form a 5,000-point extended data block shown at 301. The 2,500-point P-code data, the locally generated data, shown at 302 is padded with 2,500 zeros at the end to form a 5,000-point extended P-code block, shown at 303.

Figure 4:
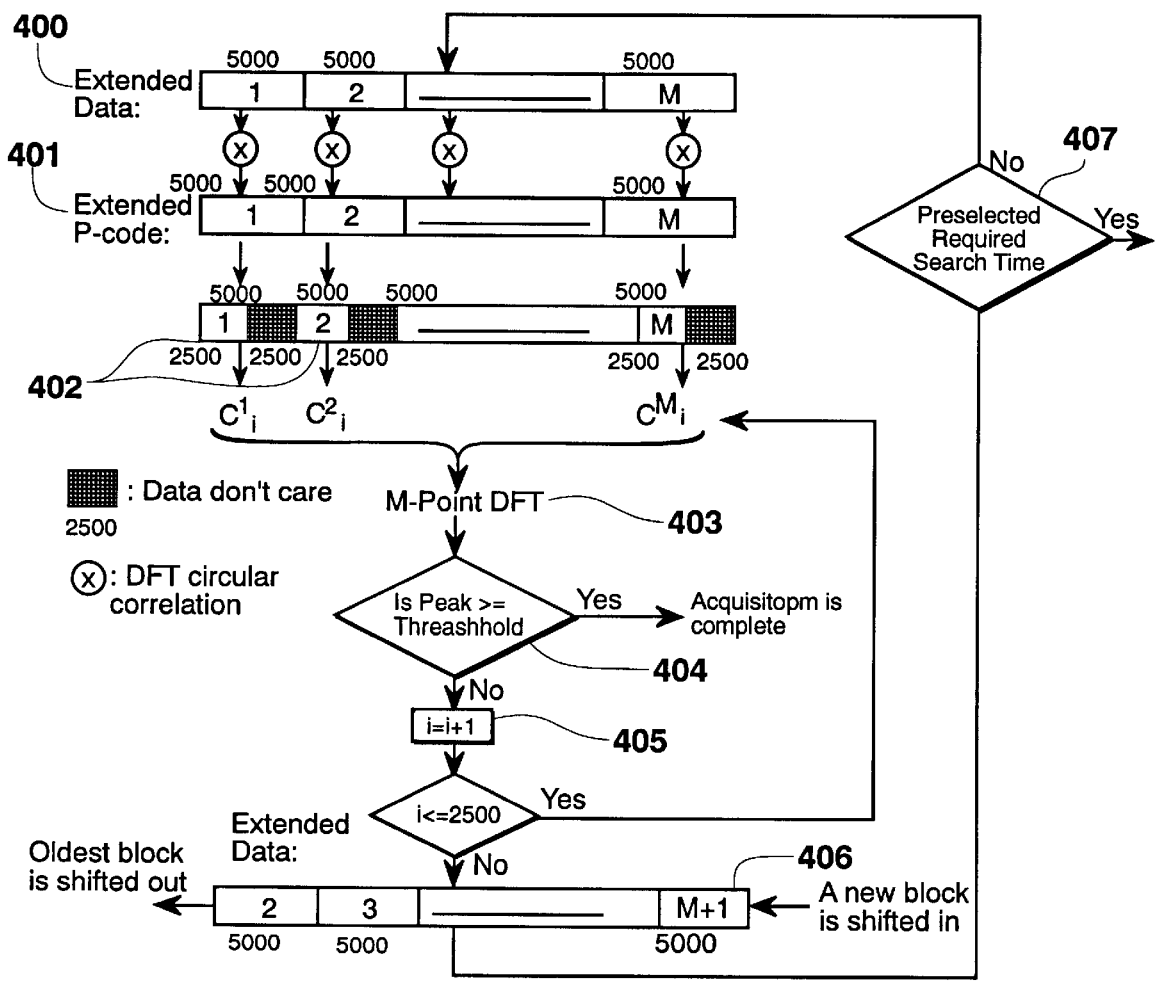
FIG. 4 shows a double block and zero padding discrete Fourier transform correlation flowgraph according to the invention.

The double block and zero padding arrangement is illustrated in FIG. 4 and applies the 5,000-point FFT circular correlation to the extended blocks of FIG. 3 to get the desired result. The extended transmitted data block is shown at 400 and the extended P-code data block is shown at 401. Only the first 2,500 points of the result, two blocks of which are represented at 402, are considered because the second 2,500 points are results from partial correlation (shaded blocks). After this operation there are 200 blocks of data and each block contains 2500 points. As represented at 403 in FIG. 4, the point with the same index from each block is taken to form a 200-point block and a 200-point FFT is then applied. If the peak of the FFT result is above the threshold, the acquisition is complete and the time and the Doppler frequency of the satellite are found. If the peak is below the threshold, as illustrated at 404, the index is increased, illustrated at 405, and the next 200-point data block is formed, a 200-point DFT is applied to it and the same detection procedure is followed. The same process is repeated until detection is declared or all 2,500 points are exhausted. If no detection occurs, a new input data block is formed by shifting 2,500 points, illustrated at 406. The procedure repeats until all 2 ms of data (2×50,000 points or 40 blocks) are exhausted.

Figure 5:
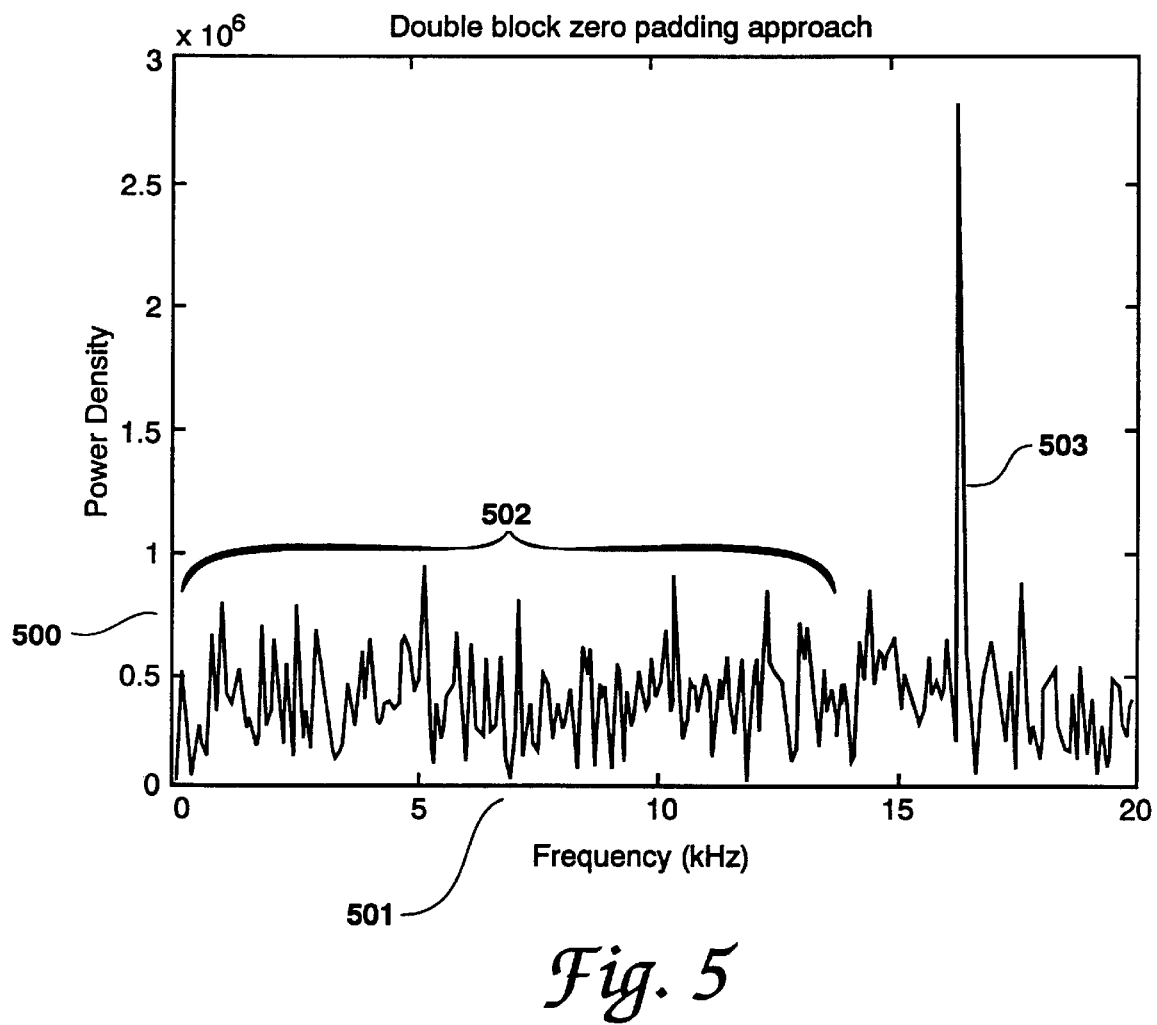
FIG. 5 shows a graphical representation of a spectral result of double block and zero padding arrangement of FIG. 4.

FIG. 5 shows the spectral result of the FIG. 4 double block and zero padding arrangement of the invention. In the graph of FIG. 5, power density is represented on the y-axis at 500 and frequency in KHz is represented on the x-axis at 501. At 502 in FIG. 5 cross correlated signal and noise and the peak at 503 represents the correlated peak in frequency domain.

Figure 6:
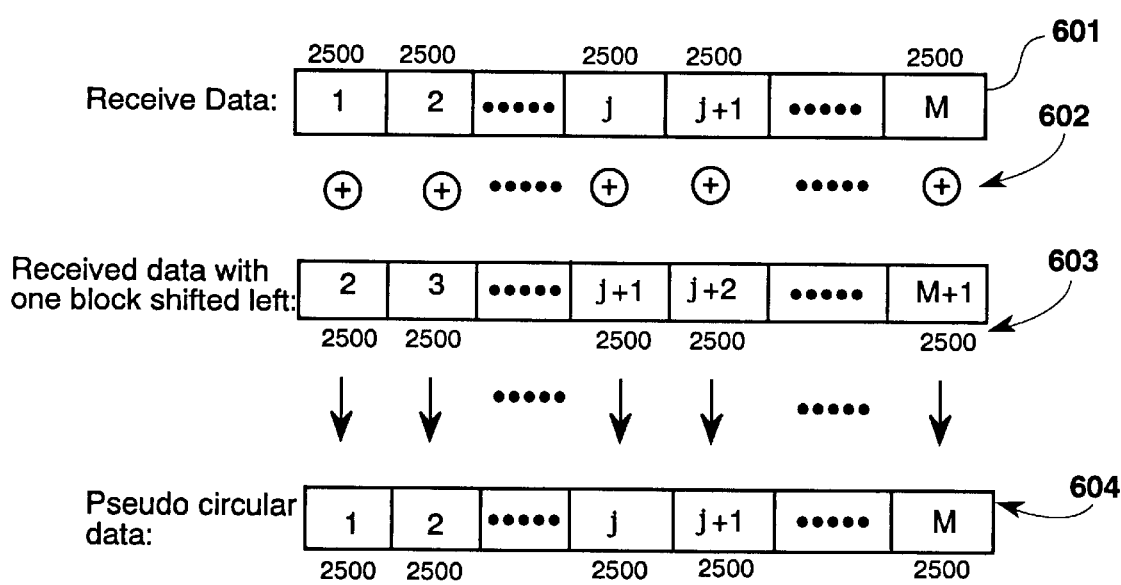
FIG. 6 shows a diagram illustrating construction of a pseudo data block.

A second arrangement of the invention may be referred to as the "pseudo circular data" arrangement. The data manipulation or block structure for the pseudocircular data arrangement is shown in FIG. 6. In order to apply the fast Fourier Transform circular correlation method to the pseudo circular data, two contiguous data blocks j, j+1, as shown in FIG. 6, are added point-by-point to form a pseudo circular data block. In FIG. 6 at 601 data block j is contiguous with data block j+1 which is added point-by-point, represented at line 602, with a contiguous block of received data represented at line 603, with one block shifted left. The sum of the two data sets is represented at 604.

Figure 7:
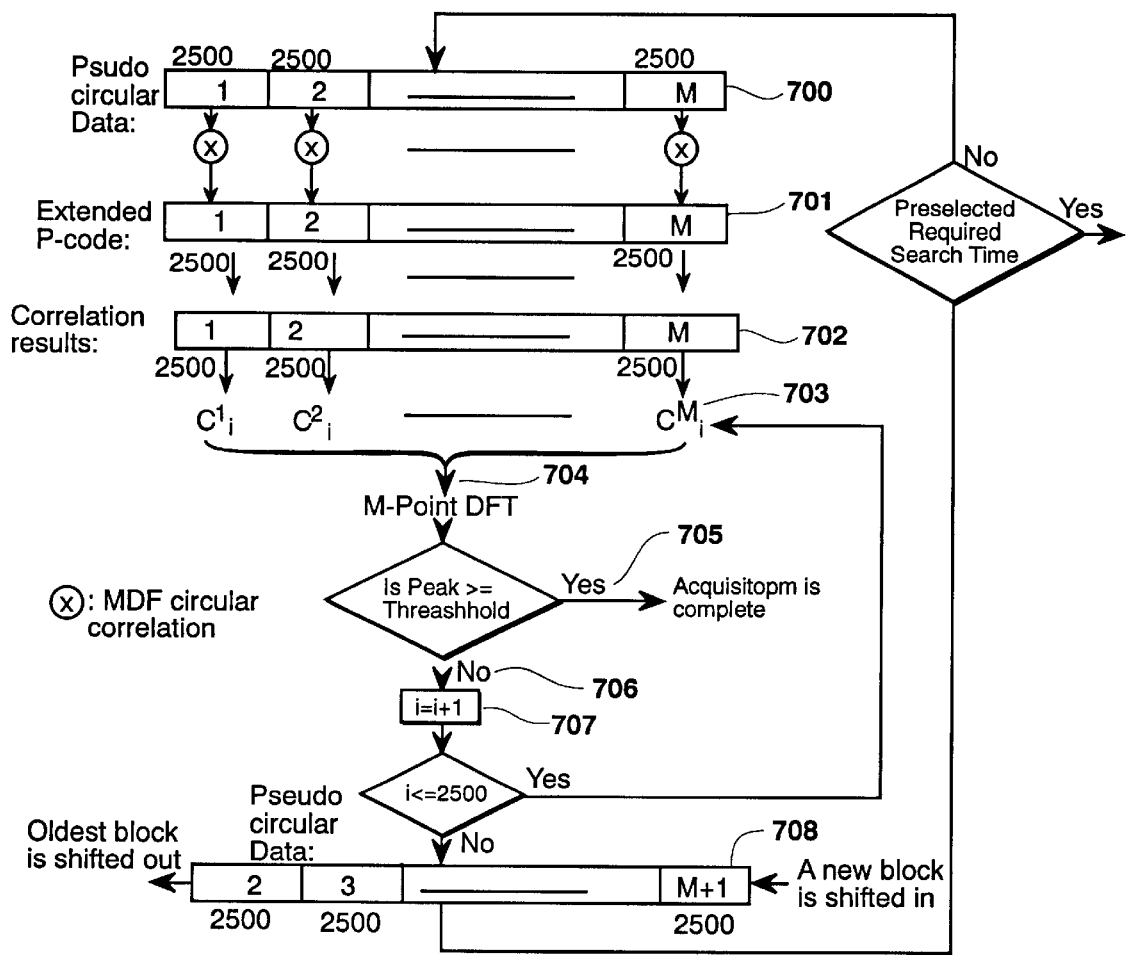
FIG. 7 shows a pseudo block circular correlation flowgraph according to the invention.

After the FIG. 6 data manipulation, illustrated at 700 and 701 in FIG. 7, there are 200 blocks of data and each block contains 2500 points. That is, instead of a 5,000 point correlation, the pseudocircular data approach, illustrated in FIG. 7, uses a 2,500-point FFT circular correlation and all the 2,500 points of correlation result, shown at 702, are valid for further FFT computation. The point with the same index from each block is taken, illustrated at 703, to form a 200-point block and a 200-point FFT is then applied, illustrated at 704. If the peak of the FFT result is above the threshold, illustrated at 705, the acquisition is complete and the time and the Doppler frequency of the satellite are found. If the peak is below the threshold, illustrated at 706, the index is increased, illustrated at 707, and the next 200-point data block is formed, a 200-point DFT is applied to it and the same detection procedure is followed. The same process is repeated until detection is declared or all 2,500 points are exhausted. If no detection occurs, a new input data block is formed by shifting 2,500 points, illustrated at 708. The procedure repeats until all 2 ms of data (2×50,000 points or 40 blocks) are exhausted.

As shown in FIG. 6, both pseudo circular blocks j and j+1 contain the original data block j+1. Theoretically, the detection peak should occur at the pseudo circular block j+1. Due to the uncertainty caused by noise, detection could happen at pseudo block j or j+1. It is necessary to determine the true time in either block j or j+1. By performing 50,000-point time domain correlation at time of detection in blocks j and at a time 2,500 points later in block j+1, the true time can be determined. The pseudocircular data arrangement is more than twice as fast as the double block zero padding arrangement in block acquisition; however, the result of the pseudocircular arrangement will be twice as noisy due to the noise addition in the block addition process.

Figure 8:
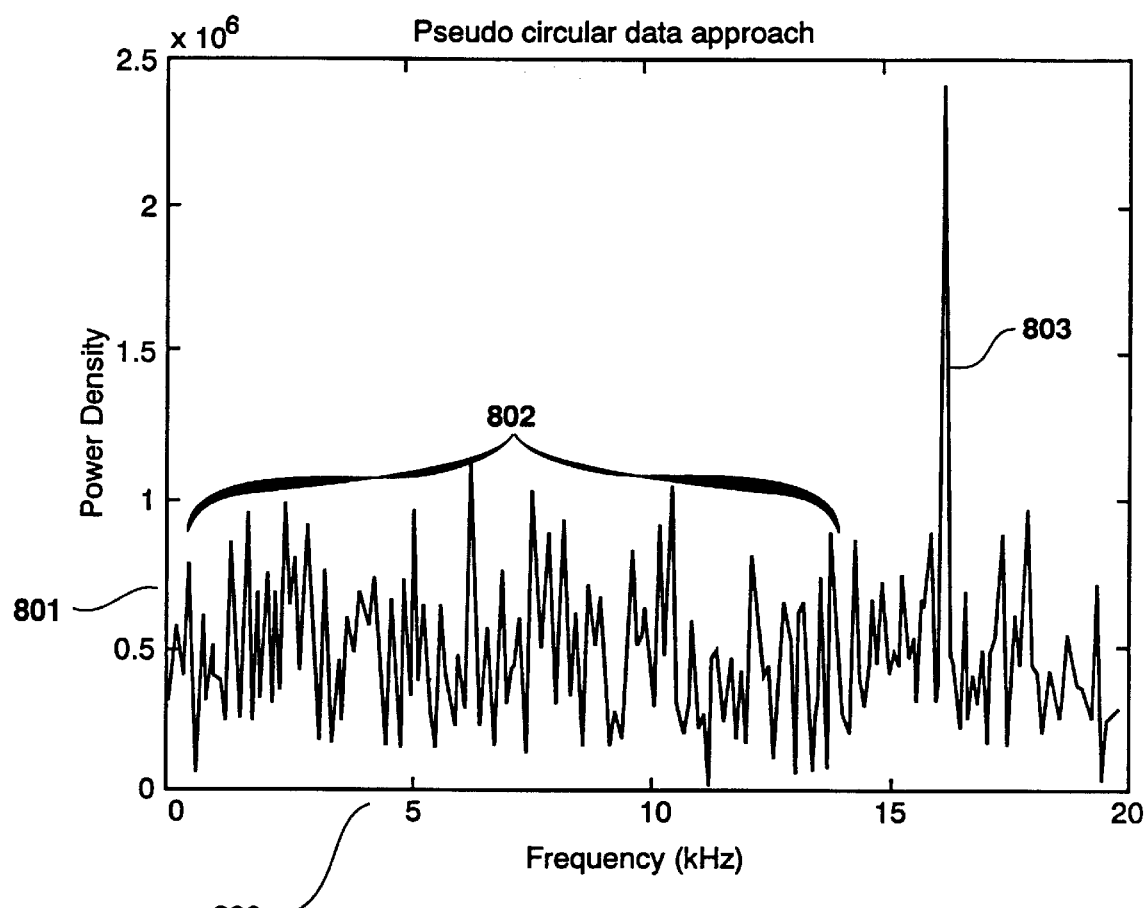
FIG. 8 shows a graph of results of pseudo circular block arrangement.

FIG. 8 shows a graph of results of pseudo circular block arrangement. The x-axis at 800 represents frequency and the y-axis at 801 represents power density. In FIG. 8, 802 represents crosscorrelated signal and noise and the peak of 803 represents the correlated result in frequency domain.

While the apparatus and method herein described constitute a preferred embodiment of the invention, it is to be understood that the invention is not limited to this precise form of apparatus or method and that changes may be made therein without departing from the scope of the invention which is defined in the appended claims.

We claim:

1. An efficient, data processing minimizing GPS data acquisition software method comprising the steps of:
   receiving a GPS signal;
   considering N data bits of locally generated P code in block-to-block correspondence with N data bits from said receiving step;
   manipulating N data bits from said receiving and considering steps into a subdivision of data bits, said subdivision of data bits constituting less than a complete transmitted pattern from said receiving step;
   applying a circular fast Fourier transform correlation algorithm on said data bits from said manipulating step;
   repeating said applying step until an output of said applying step is above a preselected acquisition threshold value; and
   determining time and Doppler frequency of said GPS signal.

2. The efficient, data processing minimizing GPS data acquisition software method of claim 1 wherein said manipulating step comprises the steps of:
   first zero padding a block of N data bits from said receiving step to comprise a data block equivalent to 2N; and
   second zero padding said block of N data bits of locally generated replica P-code from said considering step to comprise a 2N-point extended data block.

3. The efficient, data processing minimizing GPS data acquisition software method of claim 1 wherein said receiving step further comprises the step of receiving a GPS C/A code signal comprising N data bits.

4. The efficient, data processing minimizing GPS data acquisition software method of claim 1 wherein said receiving step further comprises the step of receiving a GPS P-code signal comprising N data bits.

5. The efficient, data processing minimizing GPS data acquisition software method of claim 1 wherein said receiving step further comprises the step of receiving a GPS C/A and P-code signals comprising N data bits.

6. The efficient, data processing minimizing GPS data acquisition software method of claim 1 wherein said manipulating step comprises the steps of:
   adding point-by-point said block of N data bits with a second contiguous block of N data bits forming a pseudo circular data block; and
   combining point-by-point a block of N data bits of locally generated P-code with a second contiguous block of N data bits of locally generated P-code forming a pseudo circular data block.

7. The efficient, data processing minimizing GPS data acquisition software method of claim 2, further including, after said applying step, the steps of:
   disregarding said second N points of an output from said applying step;
   separating said N data points from said disregarding step into M data blocks, each of said M data blocks containing N data points; and
   applying an M-point fast Fourier transform thereto.

8. An efficient, data processing minimizing GPS receiving device determining time and Doppler frequency of a GPS signal comprising:
   a GPS signal receiving antenna;
   a data processor connected to said GPS signal receiving antenna manipulating data from said antenna into N data bits;
   a local P-code generator communicating with said data processor generating N data bits of P code in block-to-block correspondence with N data bits from said data processor;
   said data processor including a data manipulation algorithm further manipulating N data bits from said received signal and from said locally generated P-code into a subdivision of data bits, said subdivision of data bits constituting less than a complete transmitted pattern received by said antenna; and
   a circular fast Fourier transform correlation algorithm applied to said subdivision of data bits, said correlation algorithm applied until an output is above a preselected acquisition threshold value.

9. The efficient, data processing minimizing GPS receiving device of claim 8 wherein said data manipulation within said data processor comprises:
   a plurality of data bits of zero value added to said N data bits from said antenna to comprise a data block equivalent to 2N; and
   a second plurality of data bits of zero value added to said N data bits from said local P-code generator to comprise a 2N-point extended data block.

10. The efficient, data processing minimizing GPS receiving device of claim 8 wherein said GPS signal receiving antenna further comprises a GPS C/A code, N-data bit signal receiving antenna.

11. The efficient, data processing minimizing GPS receiving device of claim 8 wherein said data processor further comprises:
   a contiguous block of N data bits added point-by-point to said block of N data bits forming a pseudo circular data block; and
   a second contiguous block of N data bits of locally generated P-code combined point-by-point with a block of N data bits of locally generated P-code forming a pseudo circular data block.

12. The efficient, data processing minimizing GPS receiving device of claim 8, wherein said fast Fourier transform circular correlation algorithm further comprises:
   a second block of N points output from said fast Fourier circular correlation application, said second block of N points eliminated from further processing within said data processor;
   a subdivision of M data blocks, said M data blocks subdivided from said block of N points and each of said M data blocks containing N data points; and
   an M-point fast Fourier transform algorithm applied to said M data blocks.

* * * * *